United States Patent [19]

Culbert

[11] Patent Number: 5,838,968
[45] Date of Patent: Nov. 17, 1998

[54] SYSTEM AND METHOD FOR DYNAMIC RESOURCE MANAGEMENT ACROSS TASKS IN REAL-TIME OPERATING SYSTEMS

[75] Inventor: Daniel Culbert, Los Altos, Calif.

[73] Assignee: Chromatic Research, Inc., Sunnyvale, Calif.

[21] Appl. No.: 609,337

[22] Filed: Mar. 1, 1996

[51] Int. Cl.$^6$ ..................................................... G06F 9/00
[52] U.S. Cl. ............................ 395/674; 395/673; 395/675
[58] Field of Search ..................................... 395/674, 675, 395/650, 67, 800; 364/244, 244.3, 281.6, 281.3

[56] References Cited

U.S. PATENT DOCUMENTS

| | | | |
|---|---|---|---|
| 4,727,487 | 2/1988 | Masui et al. | 395/67 |
| 4,890,227 | 12/1989 | Watanabe et al. | 395/800 |
| 5,233,533 | 8/1993 | Edstrom et al. | 364/468 |
| 5,325,525 | 6/1994 | Shan et al. | 395/650 |

OTHER PUBLICATIONS

Sudarshan K. Dhall and C.L. Liu, "On a Real–Time Scheduling Problem", Operations Research, vol. 26, No. 1, Jan.–Feb. 1978, pp. 127–140.

C.L. Lou and James W. Layland, "Scheduling Algorithms for Multiprogramming in a Hard–Real–Time Environment", Journal of the Association for Computing Machinery, vol. 20, No. 1, Jan. 1978, pp. 46–61.

J.F. Bortolotti, P. Vernard, and E. Bouchet, "RTKM: A Real–Time Microkernel", Dr. Dobb's Journal, May 1994, pp. 70, 72, 74, 76, 105–106.

David Shear, "Three DSP RTOSs are Ready to Merge with Windows", EDN–Technology Update, Jun. 1994, pp. 29–30, 32 and 34.

*Primary Examiner*—Majid A. Banankhah
*Attorney, Agent, or Firm*—Skjerven, Morrill, MacPherson, Franklin & Friel, L.L.P.; Stephen A. Terrile

[57] ABSTRACT

A system and method for dynamic resource management across tasks in real-time operating systems is disclosed. The system and method manage an arbitrary set of system resources and globally optimize resource allocation across system tasks in a dynamic fashion, according to a system specified performance model. The present invention provides a mechanism for system programmers to program tasks such that system performance will be globally optimized and dynamically managed over a system programmer-controllable set of system resources. The invention supports a mechanism for defining and managing arbitrary resources through a task resource utilization vector. Each task resource utilization vector contains an arbitrary number of task resource utilization records that contain quantities of system resources that each task qualitatively prefers to utilize while executing on the processor. Each of the task utilization records contains a run level that reflects the associated task's ability to perform its work when allocated the resources according to the particular task resource utilization record. This run level is used to dynamically vary the quantity of system resources that the task has allocated, based on the availability of system resources and the priorities of the tasks.

23 Claims, 6 Drawing Sheets

SYSTEM AND METHOD FOR DYNAMIC RESOURCE MANAGEMENT ACROSS TASKS IN REAL-TIME OPERATING SYSTEMS

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the patent and trademark office patent file or records, but otherwise reserve all copyright rights whatsoever.

FIELD OF THE INVENTION

The present invention relates to operating systems, and more particularly to dynamic resource management between tasks in real time operating systems.

RELATED APPLICATIONS

This application is related to the U.S. patent application Ser. No. 08/541,565 entitled: "MULTI-MEDIA ENGINE INCLUDING PROCESSOR USING VARIABLE LENGTH INSTRUCTIONS" to James T. Battle, Andy C. Hung, and Stephen C. Purcell filed Nov. 10, 1995, and the U.S. patent application Ser. No. 08/556,416 entitled "A SYSTEM AND METHOD FOR FAST CONTEXT SWITCHING BETWEEN TASKS" to Denis Gulsen filed Nov. 10, 1995 the contents of which are hereby incorporated by reference in their entirety.

BACKGROUND

Real Time operating systems have been in use in a variety of embedded systems for many years. These systems were often special purpose systems such as operating systems to support embedded algorithms in military devices such as acquiring and tracking targets, or software to manage large switching systems. Real time operating systems all share similar restrictions. First the hardware available for processing is physically constrained, i.e. limited physical memory and backing store. Second, task reliability is essential. If a task fails due to lack of resources the entire system may cease to function. Hence resource allocation for real-time tasks must be precise and consistent.

An example of a physical constraint is limited physical memory. Physical memory is also a constraint in non-realtime multi-tasking environments. Virtual memory is an example of a solution to alleviate physical memory limitations. The technique of virtual memory allows application programs to believe they have access to physical memory beyond what is actually available in hardware. This is accomplished through various techniques such as swapping and paging which relocate physical memory pages to backing store without the knowledge of the application. Traditional virtual memory techniques are not currently usable in real-time systems because the latency associated with copying physical memory pages to backing store is too long and time delays are indeterminate.

In order for a real time task to meet its schedule or processing deadline, it must have access to the critical system resources necessary for processing. Previous systems attempt to manage resource constraints by simply checking once, usually at task initiation, whether there are enough resources available for the task to execute. Such systems may also provide rudimentary static allocation through a reservation system. In a reservation system, a task requests the resources it needs from the system, sometimes at task invocation, other times at system initialization. The system withholds those resources from the available pool for future use by the task. With static allocation, or reservation, of resources, resources can become fragmented or under-utilized easily. Additionally, the system cannot readjust resources to a particular task once it has been allocated, or the other tasks may become resource-starved. Thus systems in which task needs or resource utilization may fluctuate, either because tasks' have terminated or because the tasks needs have changed, cannot readjust the resources available to other tasks. Static system resource optimization is thus limited to manual methods which can only approximate actual run-time optimal usage.

Systems are known which provide simple static memory reservation capabilities to ensure that tasks can receive the necessary amount of physical or virtual memory. Such systems include MacOS from Apple Computer Corporation, and UNIX originally developed by AT&T. These systems allow a task to register a necessary amount of memory and the operating system will not start the task unless enough free memory is available. These are examples of simple static resource allocation mechanisms. Because these systems only support static reservations, a task must reserve the maximum amount of resources necessary at any time during its execution in order to ensure adequate resources. This leads to under-utilization of the resource due to internal fragmentation. As the hardware components of systems have increased in complexity and memory has become less expensive, simple static allocation techniques no longer provide enough flexibility to optimize resource utilization. A new method capable of globally optimizing resource allocation for multiple resources across tasks is needed.

Globally optimizing and managing resource utilization provides many benefits to the real-time programmer. First the programmer is guaranteed that the task will not abnormally terminate due to the unavailability of resources. Second, the system can maximize the use of its resources based on the needs of the tasks currently operating, thus enabling more tasks to execute concurrently.

In order to understand the uses of dynamic resource allocation a brief discussion of real time operating system programming is in order. Real time systems are characterized by limited resources (hardware) and time criticality of operations. Real time systems are often embedded systems where the system cannot be readjusted or restarted easily. For example control processors in manufacturing environments, real time medical monitoring systems, or remote satellite imaging systems. Programmers of these systems are faced with resource limitations (hardware in satellites can't change), or time criticality constraints (patients may die if the monitoring software misses a hardware interrupt giving the system vital input). The unavailability of necessary resources, such as physical memory, main processor, or input/output bus cycles can cause problems in these environments. Therefore programmers must expend precious instruction cycles to check and verify that the resources they need are available or can be obtained.

This programming model is necessary because real time systems do not provide generalized support for resource re-allocation, at most they provide the static reservation capability discussed earlier. Often programmers must rely upon cooperative allocation of resources. In addition complex real time systems are usually programmed by more than one programmer, or may be later reprogrammed by the same programmer. In this case, the cooperative resource allocation mechanism is prone to error due to lack of enforceable allocation mechanisms and no re-allocation mechanisms.

Finally programmers must manually determine how to balance resources between high priority tasks and low priority tasks. If a low priority task requires a large number of resources, but is not time critical, programmers have little choice but to hope that those resources are available when the low priority task runs. In static reservation systems a low priority task cannot pre-allocate all the resources it needs since that would make those resources unavailable for time critical tasks. Yet if a time critical task fails to deallocate its resources, the low priority task may never be able to execute since it cannot acquire the resources necessary to run.

SUMMARY OF THE INVENTION

The present invention provides a new method for optimal resource management between tasks in a real time multi-tasking environment. It is one aspect of the present invention to provide a resource allocation mechanism for multiple resources. It is another aspect of the invention to provide for dynamic resource management facilitating migration of resources from one task to another and from resource to resource. It is a further aspect of this invention that the allocation of resources is globally optimized and dynamically managed across all tasks in the real time operating system.

The present invention provides a mechanism for system programmer to program tasks such that system performance will be globally optimized and dynamically managed over a system programmer-controllable set of system resources. The invention supports a mechanism for defining and managing arbitrary resources through a task resource utilization vector. Each task utilization vector contains an arbitrary number of task resource utilization records that contain quantities of the pluralities of system resources that each of the plurality of tasks qualitatively prefers to utilize while executing on the processor. Each of the these task utilization records contains a run level reflecting the associated task's ability to perform its work when allocated the resources according to the particular task resource utilization record. This run level is used to dynamically vary the quantity of the plurality of system resources that tasks have allocated based on the availability system resources and the priorities of the plurality of tasks.

The invention also provides for a flexible global optimization mechanism that enables the resource manager to dynamically manage system resources. The optimization mechanism operates by keeping track of actual system resource utilization through periodic measuring by updating the current task utilization record to reflect the consumption of the of the plurality of system resources, and by using this information to allocate or deallocate resources from tasks in order to satisfy system resource requests.

Tasks participate in the resource management by responding to queries from the system to determine if they can change their consumption of at least one of the system resources. Next the global optimizer computes a plurality of global system performance scores based on the responses to the queries of the tasks and a specified system performance model.

Finally the invention provides for setting each of the tasks to the resource utilization record associated with the global system performance score which optimizes system performance according to the specified system performance model. In the present invention the system performance model takes into account the priorities of the tasks, the resource utilization run level associated with the particular task and the priority of the task requests to determine the allocation or deallocation of system resources.

One advantage of this invention is that it dynamically manages system resources. Another advantage of the invention is that the type of system resources managed are not limited. System programmers may specify the types of systems resources they wish to use on a task by task basis with a plurality of resource usage levels, not just a static allocation. A system programmer may add their own resources to be managed into the system resource master tables, thus enabling the operating system to dynamically manage resource contention on their behalf.

Another advantage of the invention is that the system performance model is capable of utilizing the various different run levels the task has specified in order to globally (across all system resources) optimize system performance.

By providing a reservation system for programmers the present invention minimizes error due to unavailability of resources, and relieves the programmer from reliance upon weak cooperative resource allocation mechanisms. In addition, by providing dynamic resource re-allocation, the present invention provides for improved overall system utilization and optimization. Finally, the present invention allows for resource cooperation between time critical high priority tasks and low priority tasks. The invention and its advantages will be better understood by referring to the description of the preferred embodiment and the figures.

DETAILED DESCRIPTION

The invention will be better understood by referring to the figures. To provide consistency the following terms are defined.

DEFINITIONS

Backing Store: A reserved location in any of physical memory, disk drive, or off-line storage used by the operating system to save task context state when the task is not the currently executing task.

Context Switching: The act of changing out one task currently executing on a processor for another task.

Degradation: The act of retrieving resources from an existing task is called degradation

ISR Interrupt Service Routine

Preempting: The act of stopping the currently active thread in order to run a thread with a higher priority. The operating system is responsible for moving all the necessary components, for example the current state of the currently active thread, and copy these components to a save location.

Register File: A set of registers, each individually addressable, capable of being programmed as special purpose registers, and having their own hardware access lines independent of general use memory.

Swapping: The act of moving data from one location or physical device to another location or device.

Task: A program capable of executing on a processor.

Task Class: A task class defines certain properties of the task which affect the way the system treats the task.

Task Context State: The information associated with a task that must be preserved when the task is not currently executing on a processor.

Virtualized Device Driver: A device driver that appears to the host system to be directly managing hardware functions on the host, however the driver software may be actually split across multiple systems and part of the software is executing on a separate processor.

Figure 1:
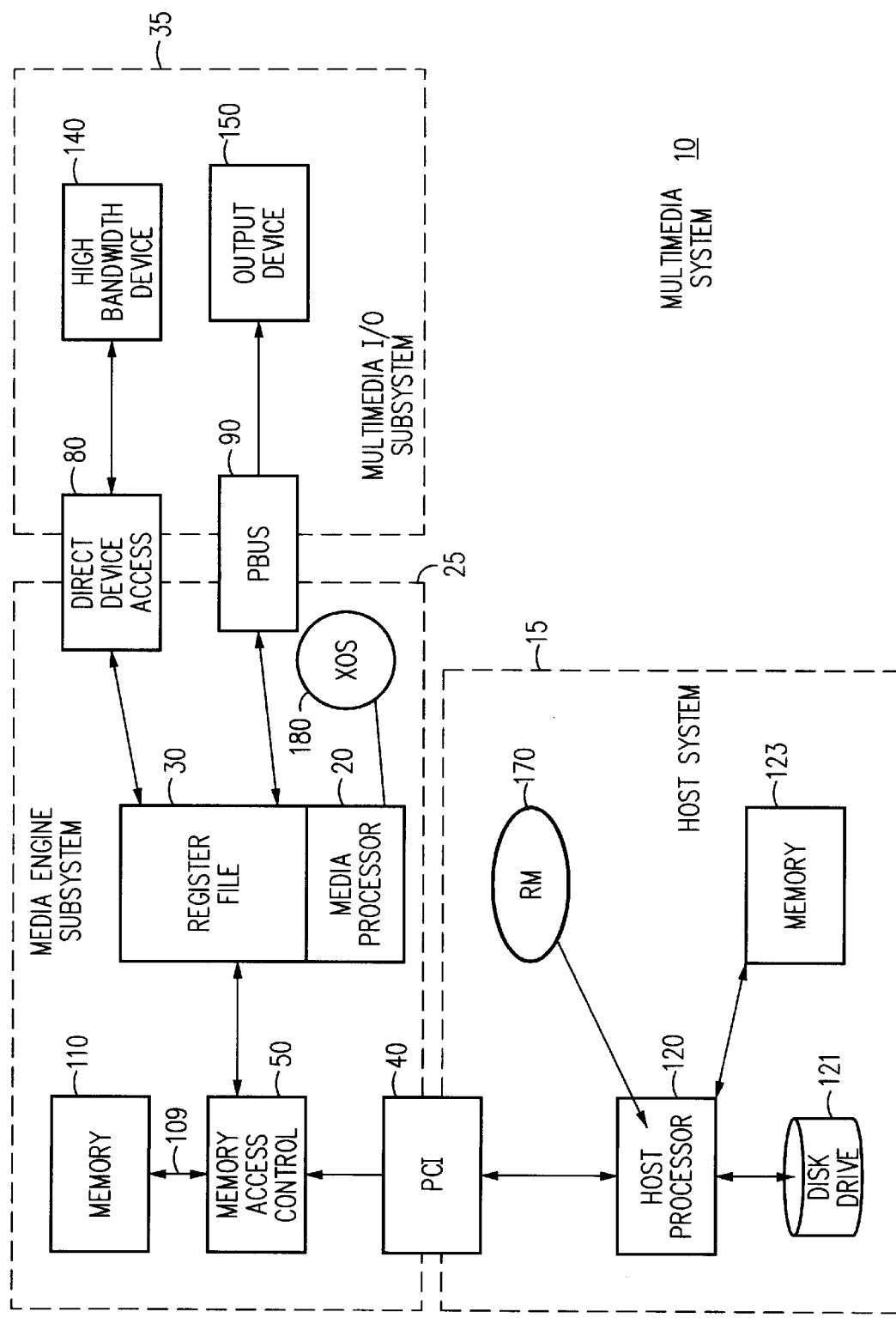
FIG. 1 is a block diagram of a processing system utilizing the media engine multimedia system in accordance with the present invention

Referring now to FIG. 1, a block diagram of an embodiment of a multimedia system 10 in accordance with the present invention is shown. Multimedia system 10, is a complete multimedia processing system. It includes host system 15, media engine subsystem 25, and input/output and multimedia (I/O) subsystem 35. Multimedia system 10 also includes an operating system which includes resource manager 170 and the real time operating system, XOS 180; the operating system interacts with, manages, and controls the various elements of multimedia system 10. More specifically, resource manager 170 controls static resource allocation and I/O bandwidth allocation of various components in media engine subsystem 25, such as memory 110 allocation, media processor 20 processor cycles, and I/O bandwidth to memory 110 through memory bus 109. XOS 180 is the real time operating system that manages the tasks that run on media processor 20. XOS 180 provides support functions for media processor 20 tasks such as interrupt processing, context switching, and subroutine calling.

Host system 15 includes host processor 120, disk drive 121, and memory 123. Host processor 120 is coupled to disk drive 121, and memory 122. Host processor 120 executes the resource manager 170. In the preferred embodiment, host processor 120 conforms to the Intel X86 architecture, but those skilled in the art will recognize that the host processor could be adapted to other architectures such as the PowerPC™ architecture, and other processor architectures.

Media engine subsystem 25 is connected to host system 15 through PCI bus 40. Media engine subsystem 25 contains a memory 110 which is accessed by media processor 20 through memory bus 109, which is controlled by memory control circuit 50. PCI bus 40 is an industry standard bus that couples memory controller 50 with host processor 120 of host system 15. Memory controller 50 controls the access to memory 110 and mitigates access from media processor 20, and host processor 120 over PCI bus 40. Memory 110 is a dynamic memory from which XOS 180 executes. XOS 180 and resource manager 170 also use memory 110 to transfer data from devices and to store and access communication subsystems implemented between XOS 180 and resource manager 170. In the preferred embodiment, memory 110 is dynamic memory, a Rambus DRAM, but those skilled in the art will recognize that other types of memory such as static memory would operate equally well.

Media engine subsystem 25 also includes media processor 20 and register file 30. Media processor 20 is coupled to register file 30. Register file 30 is coupled to memory controller 50 which facilitates transfer of data from memory 110 into register file 30. Register file 30 is also coupled to direct device access control circuit 80 and peripheral bus 90.

Media processor 20 is a vector processing unit on which XOS 180 executes and from which XOS 180 controls the operation of tasks running on the media processor 20. XOS 180 manages task use of the register file 30, state transitions for XOS 180 tasks, and interrupt service routine instantiation.

Register file 30, is, e.g., a static RAM, and includes a plurality of individually addressable units. Each addressable unit is, e.g., a 72 bit Dword. Software and hardware are coupled to register file 30 for, e.g., instruction caching and storing instruction operand and result data. Register file 30 provides a buffer for other hardware functions such as peripheral bus control 90, emulation register control, and direct device access 80 and is coupled to each of peripheral bus control 90, and direct device access 80. The buffer of register file 30 can be used in a variety of programmatic ways such as first in/3first out (FIFO) queue, random access, or accessed via memory mapping or other common access techniques.

Multimedia I/O subsystem 35 contains a plurality of devices for sending and receiving input and output. Multimedia I/O subsystem includes direct device access 80, high bandwidth device 140, Pbus 90, and output device 150. In the present embodiment direct device access 80 is a buffer coupled to register file 30 to which high bandwidth devices 140 may be attached. Direct device access 80 is coupled to and allows high bandwidth device 140 to send and receive data directly to or from a portion of the register file. High bandwidth devices 140 may be any of a variety of devices including special purpose optical devices, such as cameras, or recording devices, or display device.

In the preferred embodiment host processor 120 is a processor running the Windows™ or MS-DOS™ operating system. However those skilled in the art will recognize that host processor 120 could be any type of processor and in fact in some embodiments, the real time operating system XOS 180 and the resource manager 170 could be operating on a common processor.

Real time tasks execute under XOS 180 on the media engine chip, while resource manager 170 is responsible for creating and dynamically managing the resources available to tasks. Tasks have a task structure commonly known in the art as a task control block that contains the control information necessary for a task to run, be suspended and resumed.

Resource manager 170 controls resource allocation and distribution for all XOS 180 tasks. resource manager 170 is responsible for globally maximizing resource utilization across all XOS 180 tasks. In order to perform its resource optimization functions, resource manager 170 maintains current allocation status information for each resource it manages. This information is stored in a master list which is periodically updated by resource manager 170.

Figure 2:
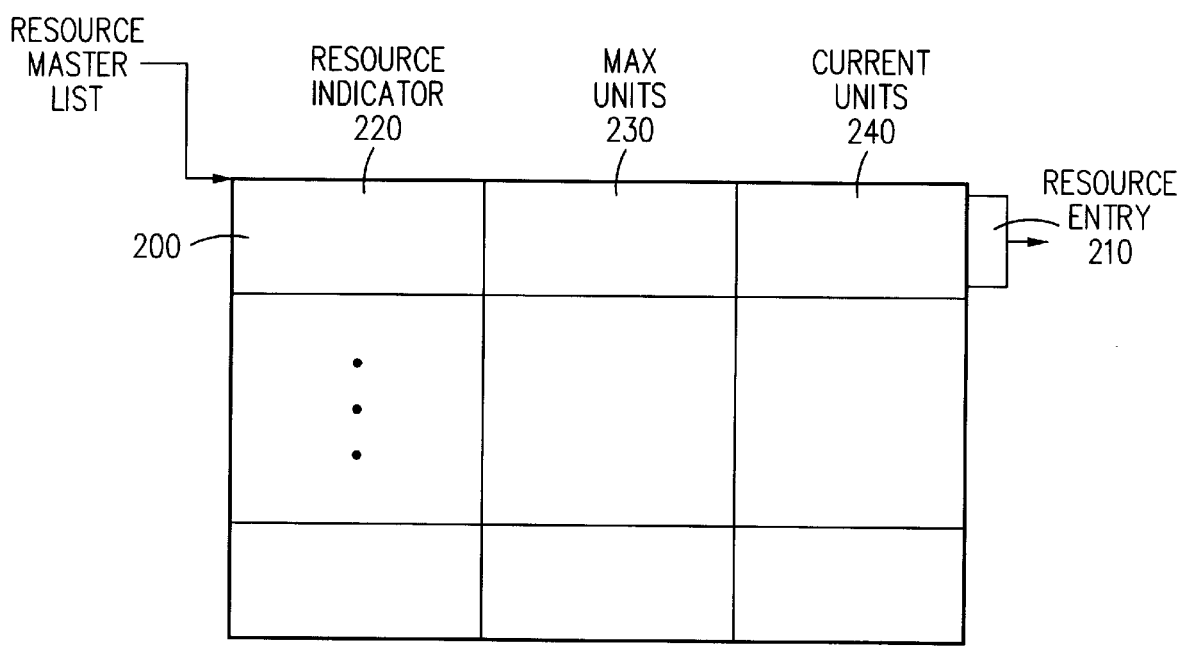
FIG. 2 is a block diagram of the master resource list utilized by the resource manager of FIG. 1.

Referring to FIG. 2, Resource master list 200 is coupled to host processor 120 and resides in host memory 123, however in another embodiment resource master list 200 could be located on memory 110, or in any other resource manager 170 accessible location. Resource master list 200 holds the state of all resources managed by resource manager 170. For each resource managed by resource manager 170, a resource entry 210 is created. Resource Entry 210 contains the resource indicator, 220 which could be a name or an index, the maximum number of allocable units, 230, and the currently allocated units 240. In the present embodiment, resources include media engine CPU 20 utilization, PCI bus 40 utilization, memory 100 utilization, and memory bus 109 utilization, and host processor 120 utilization. However it should be noted that the list of resources is not exhaustive. System programmers may add their own resources as resource master list 200 is designed to be expandable. Examples of other types of resources include special purpose hardware and other input/output devices. The maximum number of allocable units is established by the hardware configuration and set by the system at startup time.

The quantity of an allocable unit is resource dependent and is established by programmatic convention. Examples of units in the present embodiment include media engine cycles per second, megabytes per second for PCI bus bandwidth, kilobytes needed for memory 100, megabytes per second for PBUS bandwidth, and host CPU cycles.

Resource manager 170 periodically updates the usage values of global system resources in resource master list 200 by calling an update routine when a timer event occurs. This facilitates task creation by maintaining current information based on actual resource usage, thus ensuring the maximum number of concurrent tasks will be supported. The routine GetPlatformUsage allows resource manager 170 to obtain recent information about actual resource usage.

---

GetPlatformUsage

---

RMPlatformManager::GetPlatformUsage
virtual void GetPlatformUsage( RMUsageInfo *info )
Effects    Returns the overall Media engine resource usage, including the total resource consumption of all XOS tasks currently in existence.
Requires    *info*
:
Modifies    *info*
:
Returns:    Usage info in *info*

---

Figure 3:
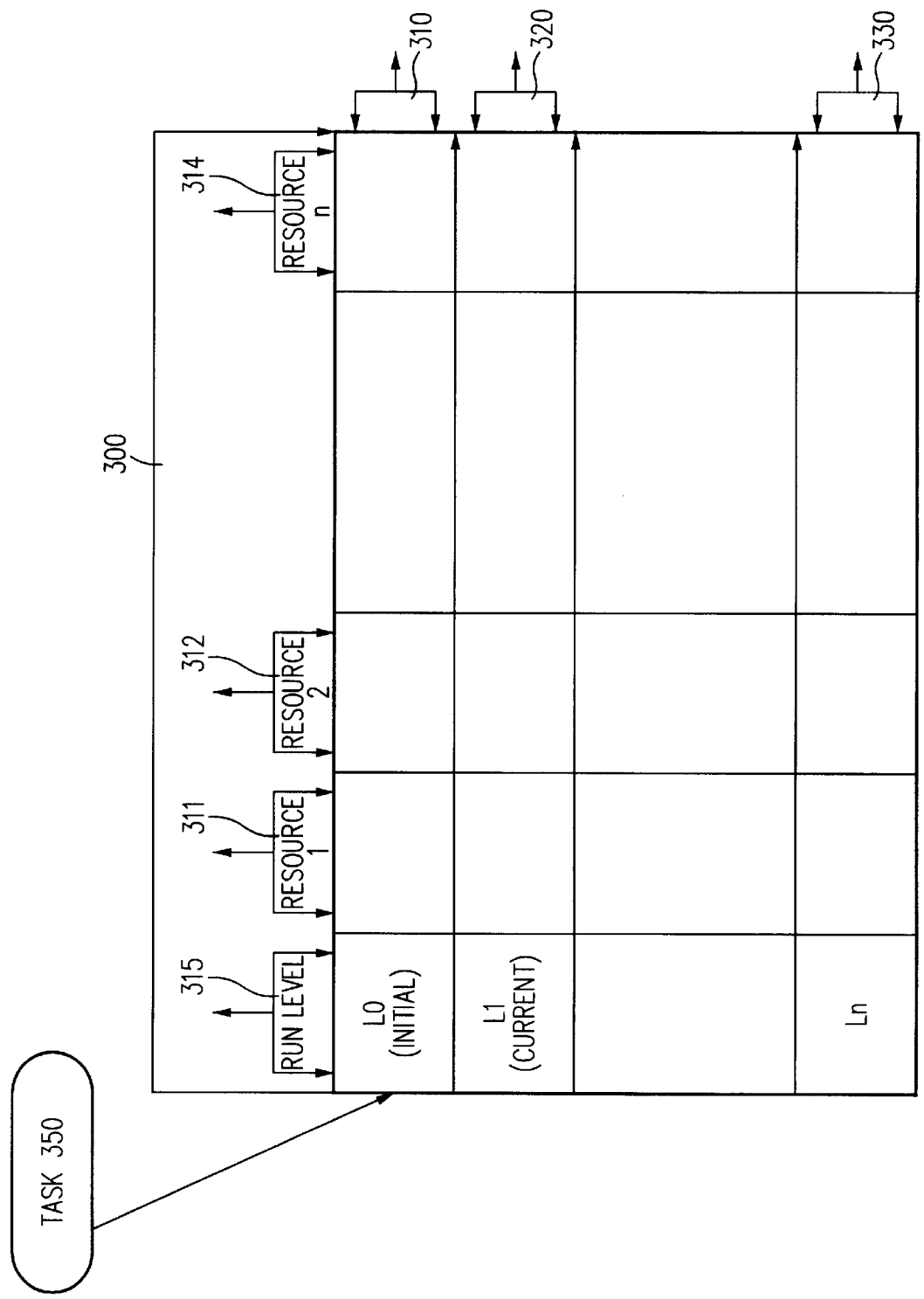
FIG. 3 is a block diagram of the task resource vector associated with the resources which are monitored by the master resource list of FIG. 2.

In the present embodiment, each task is responsible for deciding the amount of each resource it requires. Referring to FIG. 3, task 350 can specify any number of resource configurations in task resource utilization vector 300. Task resource utilization vectors are located in host memory 123 and are linked together in the host memory. In the present embodiment, task resource utilization vector 300 is coupled to task 350. Tasks must specify at least one task resource utilization record, 310, which specifies the required quantities of the resources managed by resource manager 170 that are necessary for Task 350 to function properly. Task resource utilization record 310, contains an index, 315, indicating the run level associated with this record, and multiple entries 311,312, 314. Each entry initially contains the quantity of the resource requested at this particular level. If a resource entry has no quantity associated with it, i.e. 0, resource manager 170 assumes the task has no requirement for that resource. This does not mean that the task does not use the resource, simply that it does not have a quantifiable need for the resource.

Those skilled in the art will recognize that task resource utilization vector 300 need not reside within the task structure itself, but could be an independent structure located within either resource manager 170 or XOS 180 so long as task 350, and resource manager 170 can access the vector.

In addition to the required first task resource utilization record, a task may specify multiple task resource utilization records. Task resource utilization records are sorted in preferred order. The first record, 310, is the most favorable allocation of resources that task 350 could use. Additional records specify other resource utilization configurations. Resource utilization configurations may be in an order. The last record specifies the minimal resource utilization configuration indicating that a resource utilization configuration below this will cause the task to fail due to resource constraints. It is not necessary that resource utilization configurations are monotonicaly decreasing for each resource. Rather they are qualitatively decreasing indicating the task will function less well at a lower level. Thus the highest level could specify 250 KB of memory and 1% CPU, and the next lower level could specify 100 KB of memory and 5% CPU indicating that the task can perform with less memory at the cost of greater CPU consumption, but will still not perform as well as if the entire 250 KB were available.

In the present embodiment tasks have three classes, error intolerant, error-tolerant realtime, and non-realtime. To guarantee proper functioning of error intolerant tasks, the resource manager must reserve resources for the worst-case usage scenario of these tasks.

Referring to FIG. 3, task 350 has 3 task resource utilization records, 310, 320, and 330. Record 310 contains a list of resources that task 350 would like to have available while executing. If task 350 cannot be allocated the resources specified in 310, task 350 could execute and perform its functions with the resources specified in record 320 or 330. However, if the resources specified in record 330 are not available, then task 350 could not execute and perform its functions properly.

In the present embodiment, the programmer specifies the required resources, however one skilled in the art would recognize that loaders, compilers, or smart tasks could specify their resource utilization without programmer intervention.

When a task is operating using a specified task resource utilization record configuration, this is called the run level. Run levels can by symbolic, e.g. optimal, optimal, next, minimal, or numeric, 1–n. This creates a matrix of run level, resource requirements which resource manager 170 uses to globally optimize resource utilization across all tasks. In the present embodiment, task resources associated with the current run level are updated with actual resource usage measurements.

The UpdateResourceMeasurement routine is activated by a timer on a periodic basis, and replaces the resource utilization record, at the current run level, 320 with actual measured resource utilizations. The routine queries the XOS 180, operating system for actual utilization of resources such as media engine CPU cycles. Other measurements are provided by the host system, or are computed from existing utilization measurements. In the present embodiment these measurements are a rolling average over time with adjustments occurring approximately every 250 milliseconds. This value is modifiable by system programmers. Note however, that error intolerant tasks never have their resource utilization records updated with actual use.

TABLE 1

---

RMThreadAttr

---

UpdateResourceMeasurement
RMPlatformManager::UpdateResourceMeasurement
    virtual void UpdateResourceMeasurement ( )

TABLE 1-continued

RMThreadAttr

| | |
|---|---|
| Effects: | Periodically synchronizes and updates the resource manager's current measurement of resource consumption. |
| Requires : | Resources such as the Media engine's CPU cycle consumption require periodic monitoring, and the resource manager's cached estimates of these resources remain as accurate as possible. The resource manager or a timer message issued by the RM's VxD calls UpdateResourceMeasurement ( ). |
| Modifies : | Internal RM structures. |
| Returns: | Nothing. |

If the media engine subsystem becomes resource constrained, and tasks have difficulty gaining access to needed resources then resource manager 170 must decide whether to lower the available resources for current tasks, or fail the task allocation request. The act of retrieving resources from an existing task is called degradation. Degradation occurs when a task is asked to give up some of its resources and move to a lower run level.

In the present embodiment, when resource degradation is necessary, tasks are degraded, i.e. the resource requirements are lowered, following system performance model:

1) Tasks with lower priority will always be degraded as much as possible before any high priority task;
2) Tasks with equal priority will be degraded equally, i.e. an attempt will be made to lower their resource requirements by the same amount; and
3) An optimal configuration will be sought, where optimal means degrading total system resources as little as possible, without violating rules 1) and 2), while maintaining real-time requirements.

These rules bound the behavior of the task selection algorithm used to determine which tasks will be degraded. In another embodiment many different task selection algorithms may be used.

Degradation can be triggered by the following conditions:

A newly allocated task requires more resources than are currently available

Media engine errors (such as missed deadlines) cause the resource manager 170 to trigger resource degradation A currently running task requests more resources Degradation may be performed under two different task execution environments: when tasks run with unequal priority and when tasks run with equal priority. In both situations, resource manager 170 seeks a global optimal configuration, one in which it degrades the total system resources as little as possible according to the rules of the task selection algorithm while still providing the needed resources.

To describe the process of degradation, some of the system structures utilized in the process will be described.

Figure 4:
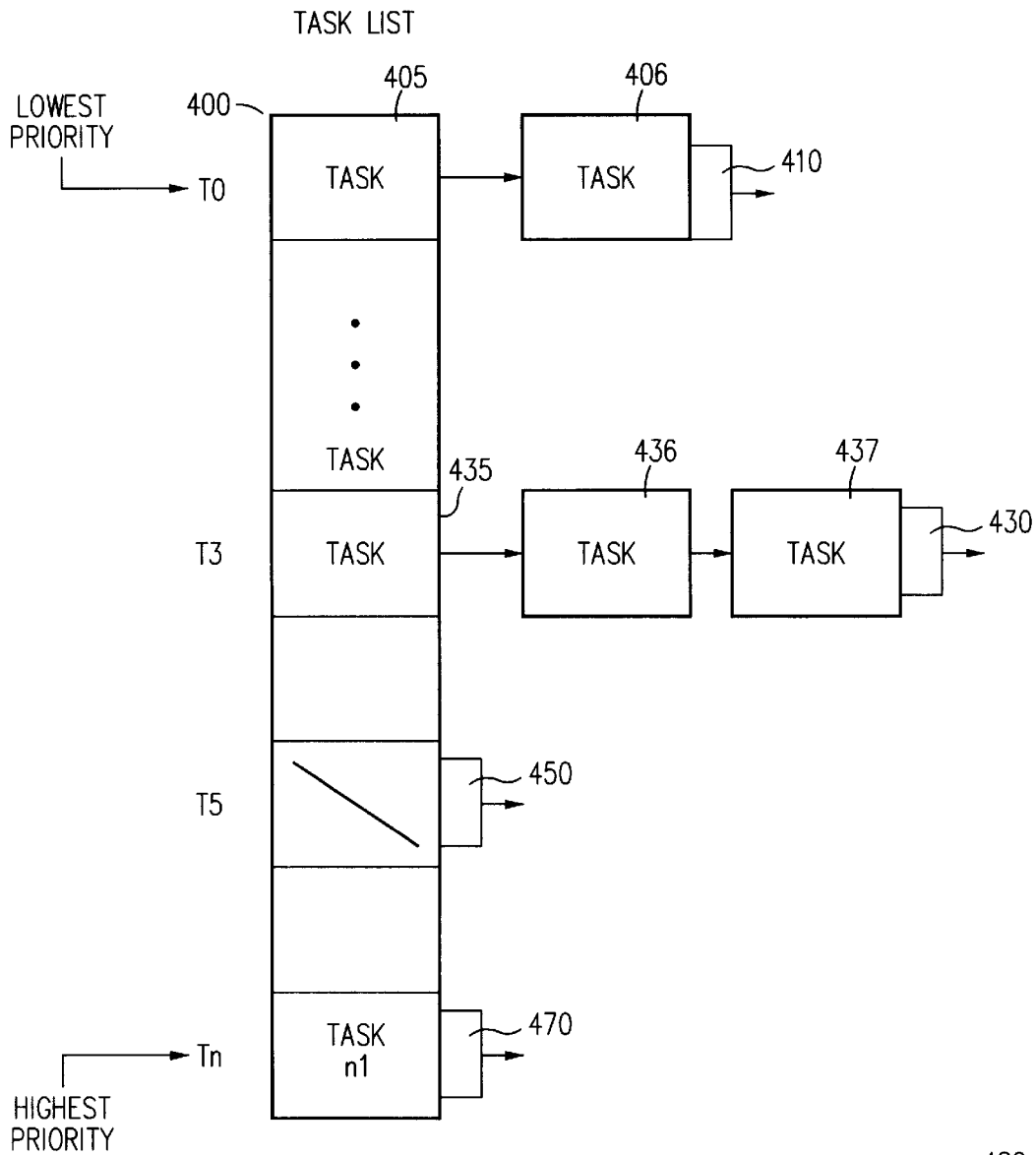
FIG. 4 is block diagram of the task list which is managed by the resource manager of FIG. 1.

According to FIG. 4, Resource manager 170 maintains a task list sorted in priority order, lowest to highest. In the present embodiment, the list is a set of vectors with each vector representing all the tasks in the system at that priority level. System task list 400 resides in host processor memory 123, and contains a list of tasks sorted by priority order. At each priority level, there may be one or more tasks currently instantiated. Priority vector 410 shows tasks 405 and 406 both operating at priority level T0. Those skilled in the art will recognize that the vector of tasks at each priority level may be implemented using a variety of structures including, but not limited to, doubly linked lists, object classes, arrays, and other structures.

Figure 4A:
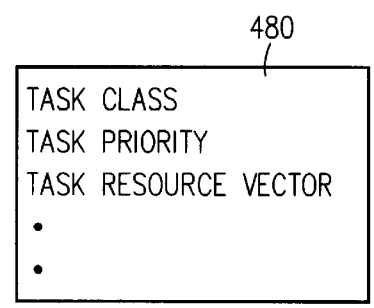
FIG. 4a is a block diagram showing information about a task.

Task vector 430 shows a vector of three tasks, 435, 436, 437 all operating at priority T3. 450 shows an empty task list. Task vector 470 shows a task with the highest priority Tn. It will be apparent to one skilled in the art that system task list 400 could be a sparse matrix, thus sparse matrix programming techniques could be used to implement an efficient structure. FIG. 4a shows information about a task 480.

Figure 5:
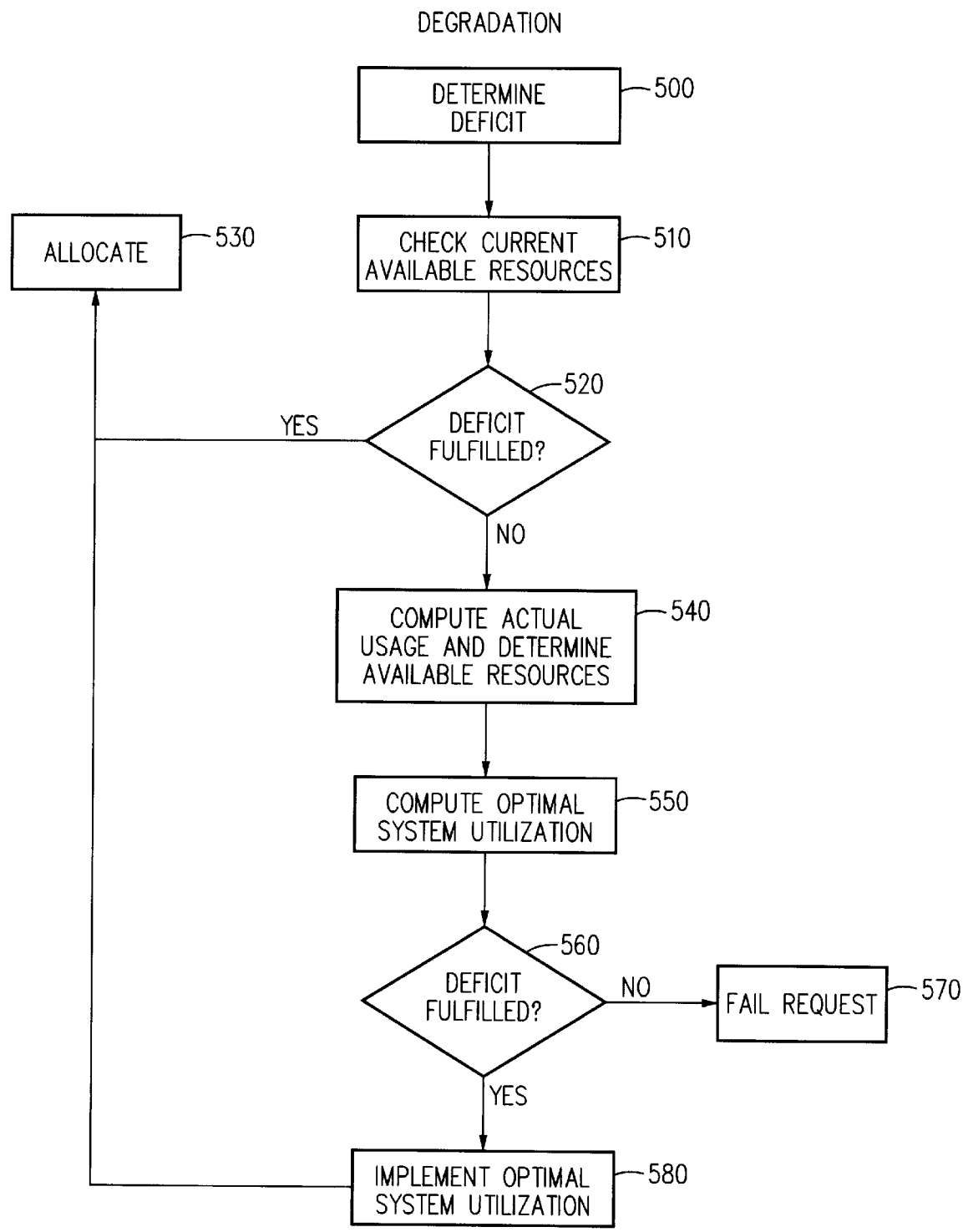
FIG. 5 is a block diagram of the degradation method executed by the resource manager of FIG. 1.

Referring now to FIG. 5, the process of degradation, QueryResult, is described.

---

QueryResult handler( DWORD ref, RMAdviseCommand command,
  RMUsageInfo *usageInfo,
  const RMUsageInfo& delta )
Effects:   Implements commands defined in command structure
           including degradation
usageInfo pointer to an RMUsageInfo block
delta: for degradation, the values in this resource vector represent the
       current resource deficit/resources needed. For promotion, the values
       represents current free resources available. ( Note: in the case of
       degradation, a resource with a negative deficit can be
       ignored - there is no conflct for that resource . In the case
       of promotion, no resource value should be set negative )

---

The degradation process, QueryResult, is executed by resource manager 170 on host processor 120. In another embodiment the degradation process could be executed on XOS 180. Referring to FIG. 5, In step 500, the deficit to be filled is determined. A resource deficit can be created by any of the triggering conditions: a new task is going to be created; a task misses a deadline; or an existing task requests more resources.

In step 510, the process first checks the currently available amount of resources. The routine GetPlatformUsage provides the necessary information.

---

GetPlatformUsage

RMPlatformManager::GetPlatformUsage
**virtual void GetPlatformUsage( RMUsageInfo *info )**
| | |
|---|---|
| Effects | Returns the overall system resource usage, including the total resource consumption of all media engine tasks currently in existence. |
| Requires : | info |
| Modifies : | info |
| Returns: | Usage info in info |

---

If the requested resources are available, as testing in step 520, then the request is fulfilled and the resources are allocated in step 530. If the resources are not available the resource manager 170, executing step 540, will scan through task list 400 and perform two functions.

First, each task, such as tasks 405, 406, 436 and 437 in task list 400 are queried and asked to update their resource utilization at the current run level. So for example task 350 would determine what its actual utilization for resources currently was and update the contents of resource utilization record 320 to reflect that usage.

Second, each task is asked what resources it would provide to the system it if were asked to. In the current embodiment, each task may respond with one of several answers.

1. The task can indicate to resource manager 170 to use the information in my task resource vector. So for example for task 350, which is operating at record 320, it could be lowered to the utilization levels in resource utilization record 330.

2. The task can respond with a quantitative amount of resource it is willing to give up. The task can specify a complete list of resources and amounts it will give up, or just a single resource and amount.

3. The task can respond that it can not be changed and can not give up any resources.

Next in 550, resource manager 170 computes an optimal system utilization score. In the present embodiment, this computation enforces the degradation performance model. Thus a score is computed taking into account:

(1) Tasks with lower priority will always be degraded as much as possible before any high priority task This means moving lower priority tasks to the lowest run level, e.g. 330 for task 350.

(2) Tasks with equal priority will be degraded equally, i.e. an attempt will be made to lower their resource requirements by the same amount. In the present embodiment this means equivalently lowering tasks at the same priority level by proportional run levels.

In addition, if the priority of the requesting task is lower than that of the task being examined for the purposes of computing the optimal system utilization score, the task will not be included in the computation unless the task in step 540 volunteered to give up resources.

In the present embodiment, the optimal system utilization configuration is computed by iterating through all tasks at all run levels and computing the system utilization score within the above parameters. In other embodiments the algorithm for computing the system utilization score could be based on particular physical constraints, or on task class types. Those skilled in the art will recognize many different algorithms may be used.

It is worth noting in that in the present embodiment, different run levels for tasks which are being considered need not be monotonicaly decreasing in resource usage. Thus in one run level, memory 100 use actually may increase in order to counteract decreases in other resources. If both memory 100 use and CPU use are high, then QueryResult may chose complementary resources. For instance, it may increase memory 100 access for one task to reduce its CPU requirement. It may reduce another task's memory 100 use at the expense of increasing that task's CPU requirement. By manipulating two or more variables in one or more task's resource usage, the resource manager 170 balances and solves the tasks' contention for resources.

In step 560, the resources recovered are compared against the deficit. If there are now enough resources available, QueryResult tells the tasks to set themselves to the specified run levels computed in the optimal system utilization level, step 580, and the process executes step 530 to allocation the resources. Otherwise in step 570, the request for additional resources is denied.

In addition to degrading tasks, resource manager 170 seeks to increase resources available to tasks by promoting tasks.

Promotion occurs when a task is allowed to consume more resources and move to a higher run level. Promoting a task increases a task's performance by allocating more resources to it when necessary. The resource manager 170 promotes a task under the following conditions:

A client requests a task promotion resource manager 170 finds resources during one of its periodic resource checks and decides to promote a task Resources become available due to task termination or task freeing resources.

Figure 6:
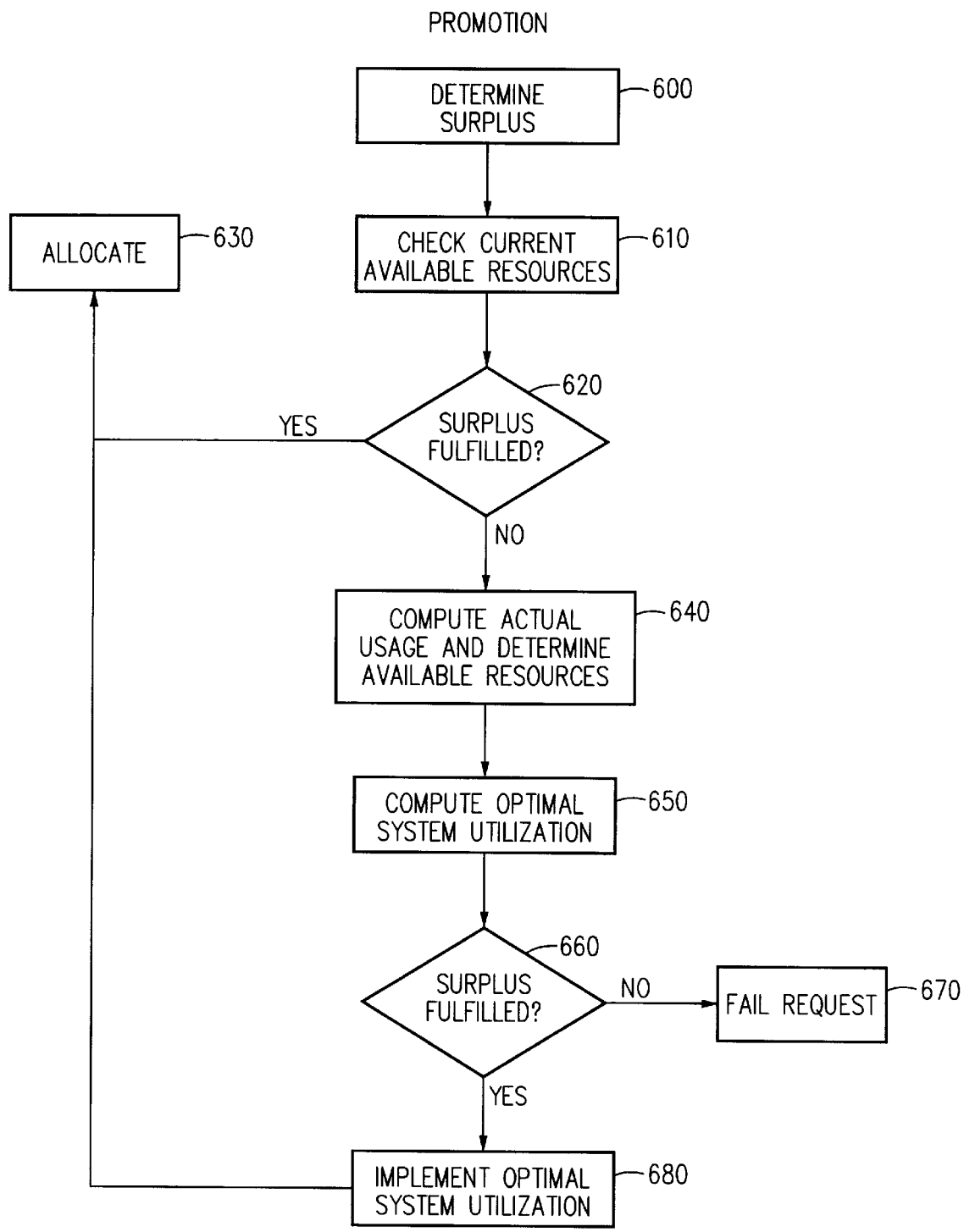
FIG. 6 is a block diagram of the promotion method executed by the resource manager of FIG. 1.

Promotion follows the same general model as degradation. In fact the same routine QueryResult is used. Referring now to FIG. 6. The process of promotion is discussed. In step 600, the surplus to be filled is determined. A resource surplus can be created by any of the triggering conditions: a task terminates; resource manager 170 finds resources; or an existing task requests more resources.

In step 610, the process first checks the currently available amount of resources. The routine GetPlatformUsage provides the necessary information.

If the requested resources are available, as testing in step 620, then the request is fulfilled and the resources are allocated in step 630. If the resources are not available the resource manager 170, executing step 640, will scan through task list 400 and perform two functions.

First, each task, such as tasks 405, 406, 436 and 437 in task list 400 are queried and asked to update their resource utilization at the current run level. So for example task 300 would determine what its actual utilization for resources currently was and update the contents of resource utilization record 320 to reflect that usage.

Second, each task is asked what resources it would be able to utilize if it had them. In the current embodiment, each task may respond with one of several answers.

1. The task can indicate to resource manager 170 to use the information in my task resource vector. So for example for task 350, which is operating at record 320, it could be raised to the utilization levels in resource utilization record 310.

2. The task can respond with an quantitative amount of resource it desires.

3. The task can respond that it is not interested in participating.

Next in step 650, resource manager 170 computes an optimal system utilization score. In the present embodiment, this computation enforces the degradation performance model. Thus a score is computed taking into account:

(1) Tasks with higher priority will always be promoted as much as possible before any low priority task.

(2) Tasks with equal priority will be promoted equally, i.e. an attempt will be made to raise their resource requirements by the same amount. In the present embodiment this means equivalently raising tasks at the same priority level by proportional run levels.

In the present embodiment, the optimal system utilization configuration is computed by iterating through all tasks at all run levels and computing the system utilization score within the above parameters. In other embodiments the algorithm for computing the system utilization score could be based on particular physical constraints, or on task class types. Those skilled in the art will recognize many different algorithms may be used.

It is worth noting in that in the present embodiment, different run levels for tasks which are being considered need not be monotonicaly decreasing in resource usage. Thus in one run level, memory 100 use actually may increase in order to counteract decreases in other resources. If both memory 100 use and CPU use are high, then QueryResult may chose complementary resources. For instance, it may increase memory 100 access for one task to reduce its CPU requirement. It may reduce another task's memory 100 use at the expense of increasing that task's CPU requirement. By manipulating two or more variables in one or more task's resource usage, the resource manager 170 balances and solves the tasks' contention for resources.

In step 660, the resources recovered are compared against the deficit. If there are now enough resources available, QueryResult tells the tasks to set themselves to the specified run levels computed in the optimal system utilization level, step 680, and the process executes step 630 to allocation the resources. Otherwise in step 670, the request for additional resources is denied.

Other Embodiments

Other embodiments are within the following claims.

More specifically, while particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention, including but not limited to implementations in other programming languages. Additionally, while the preferred embodiment is disclosed as a software implementation, it will be appreciated that hardware implementations such as application specific integrated circuit implementations are also within the scope of the following claims.

What is claimed is:

1. A method of dynamic resource management on a data processing system including a processor, at least one system resource, and a plurality of tasks, the processor being coupled to the system resource and capable of executing the plurality of tasks, the method comprising the steps of:

executing instructions on the processor to create at least two tasks capable of executing on the processor, each of the at least two tasks having a priority;

creating at least one task resource utilization vector for each of the at least two tasks, the task resource utilization vector comprising the quantity of the at least one system resource that each of the at least two tasks prefers to utilize while executing on the processor; and dynamically varying the quantity of the at least one system resource that the at least two tasks have allocated based on the availability of the at least one system resource and the priorities of the at least two tasks.

2. The method of claim 1 wherein said task resource utilization vector comprises a plurality of task resource utilization records and the steps of dynamically varying the quantity of the at least one system resource include:

for each task resource utilization record of the plurality, assigning a run level to each task utilization record reflecting the associated task's ability to perform its work when allocated the resources according to each task resource utilization record;

initially allocating each of the at least two tasks an associated task utilization record such that the task with the higher priority obtains the quantity of the at least one system resource specified in the associated task utilization record which guarantees the most efficient performance of the higher priority task;

measuring the actual at least one system resource utilization of the at least two tasks on a periodic basis;

and adjusting the at least two tasks to use the at least one system resource such that the at least two tasks execute use of the plurality of task utilization records based on the efficient use of the data processing system.

3. The method of claim 2 where determining the efficient use of the data processing system comprises the steps of:

for each of the at least two tasks computing the current consumption of the at least one system resource;

updating the current task utilization record to reflect the consumption of the at least one system resource;

querying the at least two tasks to determine if they can change their system resource consumption;

computing a plurality of global system performance scores based on the responses to the queries of the at least two tasks and a specified system performance model; and setting each of the at least two tasks to the resource utilization record associated with the global system performance score which optimizes system performance according to the specified system performance model.

4. A method of dynamic resource management on a data processing system including a processor, a plurality of system resources, and a plurality of tasks, the processor being coupled to the system resource and capable of supporting the tasks, the method comprising the steps of:

executing instructions on the processor to create a plurality of tasks capable of executing on the processor, each of the plurality having a priority;

creating a plurality of task resource utilization records for each of the plurality of tasks, each task resource utilization record of the plurality comprising quantities of the pluralities of system resources that each of the plurality of tasks qualitatively prefers to utilize while executing on the processor;

for each task resource utilization record of the plurality, assigning a run level to the task utilization record reflecting the associated task's ability to perform its work when allocated the resources according to each task resource utilization record; and dynamically varying the quantity of the plurality of system resources that the plurality of tasks have allocated based on the availability of the plurality of system resources and the priorities of the plurality of tasks.

5. The method of claim 4 where the dynamic varying of the allocation of the plurality of system resources comprises:

periodically measuring the actual system resource utilization of the plurality of tasks;

updating the plurality of task resource utilization records to reflect the consumption of the of the plurality of system resources;

querying each of the plurality of tasks to determine if they can change their consumption of at least one of the plurality of system resources;

computing a plurality of global system performance scores based on the responses to the queries of the plurality of tasks and a specified system performance model; and setting each of the plurality of tasks to the run level associated with the global system performance score which optimizes system performance according to the specified system performance model.

6. A system for dynamic resource management on a data processing system including a plurality of processors, a plurality of system resources, and a plurality of tasks, the plurality of processors being coupled to the plurality of system resources and capable of supporting the tasks, the system comprising:

instructions that when executed on at least one of the plurality of processors create a plurality of tasks capable of execution on at least one of the plurality of processors, each of the plurality of tasks having a priority;

means for creating a plurality of task resource utilization records for each of the plurality of tasks, each task resource utilization record of the plurality comprising quantities of the pluralities of system resources that each of the plurality of tasks qualitatively prefers to utilize while executing on the at least one processor;

means for assigning a run level to each of the task utilization records of the plurality of tasks, each run level reflecting the associated task's ability to perform its work when allocated the resources according to each task resource utilization record; and means for dynamically varying the quantity of the plurality of system resources that the plurality of tasks have allocated based on the availability of the plurality of system resources and the priorities of the plurality of tasks.

7. A method of dynamic resource management on a data processing system including a processor and a system resource coupled to the processor, the method comprising the steps of:

executing instructions on the processor to create a plurality of tasks capable of execution on the processor, each of the tasks having a priority;

creating a task resource utilization vector for each of the plurality of tasks, the task resource utilization vector including at least one task utilization resource record specifying a resource quantity request; and dynamically varying the resource quantity requests for each of the plurality of tasks based on the availability of the system resource and the priorities of at least two of the plurality of tasks.

8. The method of claim 7 wherein the data processing system includes a plurality of resources.

9. The method of claim 7 wherein each of the plurality of tasks is a member of one class of tasks, each class selected from error intolerant, real time, and non-real time, the method further comprising the step of reserving resources for error intolerant tasks.

10. The method of claim 7 wherein at least one task resource utilization vector includes a plurality of task resource utilization records, the step of dynamically varying the resource quantity requests further comprising:

assigning a run level to each task resource utilization record, each run level reflecting the associated task's ability to perform its work when allocated resources according to the associated task's resource utilization record;

allocating the resource to each task based on each task's resource utilization records, run level, and priority, such that a first task having a priority greater than that of a second task will receive a first portion of the resource according to a preferred run level while a second portion of the resource is allocated to the second task;

measuring actual resource utilization of each task on a periodic basis; and adjusting at least one of the plurality of tasks' resource utilization records such that the execution of the plurality of tasks is based on the efficient use of the resource.

11. The method of claim 10 wherein the first portion of the resource is greater than the second portion of the resource.

12. The method of claim 10 wherein the plurality of task resource utilization records are sorted into a preferred order.

13. The method of claim 10 where adjusting at least one of the plurality of tasks' resource utilization records further comprises the steps of:

computing the consumption of the resource for at least one task;

updating at least one task utilization record to reflect consumption of the resource;

querying at least one task to determine if it can change its resource consumption;

computing a plurality of global system performance scores based on the response to querying at least one task and a specified system performance model; and setting at least one task to a resource utilization record associated with the global system performance score which optimizes system performance according to the specified system performance model.

14. A method of dynamic resource management on a data processing system including a plurality of processors and a system resource coupled to the plurality of processors, the method comprising the steps of:

executing instructions on at least one of the plurality of processors to create a plurality of tasks capable of execution on any of the plurality of processors, each of the tasks having a priority;

creating a task resource utilization vector for each of the plurality of tasks, the task resource utilization vector including at least one task utilization resource record specifying a resource quantity request; and dynamically varying the resource quantity requests for each of the plurality of tasks based on the availability of the system resource and the priorities of at least two of the plurality of tasks.

15. The method of claim 14 wherein at least one task resource utilization vector includes a plurality of task resource utilization records, the step of dynamically varying the resource quantity requests further comprising:

assigning a run level to each task resource utilization record, each run level reflecting the associated task's ability to perform its work when allocated resources according to the associated task's resource utilization record;

allocating the resource to each task based on each task's resource utilization records and priority, such that a first task having a priority greater than that of a second task will receive a first portion of the resource according to a preferred run level while a second portion of the resource is allocated to the second task;

measuring actual resource utilization of each task on a periodic basis; and adjusting at least one of the plurality of task's resource utilization records such that the execution of the plurality of tasks is based on the efficient use of the resource.

16. The method of claim 15 where adjusting at least one of the plurality of tasks' resource utilization records further comprises the steps of:

computing the consumption of the resource for at least one task;

updating at least one task utilization record to reflect consumption of the resource;

querying at least one task to determine if it can change its resource consumption;

computing a plurality of global system performance scores based on the response to querying at least one task and a specified system performance model; and setting at least one task to a resource utilization record associated with the global system performance score which optimizes system performance according to the specified system performance model.

17. A computer system comprising:

a plurality of resources including a processor and a memory coupled to the processor; and a resource manager program, the program being executed by the processor and including:

a routine to create a plurality of tasks capable of execution on the processor, each of the tasks having a priority;

a routine to create a task resource utilization vector for each of the plurality of tasks, the task resource utilization vector including at least one task utilization resource record specifying a resource quantity request; and a routine to dynamically varying the resource quantity requests for each of the plurality of tasks based on the availability of the system resource and the priorities of at least two of the plurality of tasks.

18. The computer system of claim 17 wherein the plurality of resources includes at least one additional processor.

19. The computer system of claim 17 wherein at least one task resource utilization vector includes a plurality of task resource utilization records, and the routine to dynamically varying the resource quantity requests further comprises:

a run level assignment routine, the run level assignment routine assigning a run level to each task resource utilization record, each run level reflecting the associated task's ability to perform its work when allocated resources according to the associated task's resource utilization record;

an allocation routine, the allocation routine allocating the resource to each task based on each task's resource utilization records, run level, and priority, such that a first task having a priority greater than that of a second task will receive a first portion of the resource according to a preferred run level while a second portion of the resource is allocated to the second task;

a resource measurement routine measuring actual resource utilization of each task on a periodic basis; and an adjustment routine, the adjustment routine adjusting at least one of the plurality of tasks' resource utilization records such that the execution of the plurality of tasks is based on the efficient use of the resource.

20. The computer system of claim 19 wherein the adjustment routine further comprises:

a resource consumption routine, the resource consumption routine computing the consumption of the resource for at least one task;

an update routine, the update routine updating at least one task utilization record to reflect consumption of the resource;

a query routine querying at least one task to determine if it can change its resource consumption;

a performance score routine, the performance score routine computing a plurality of global system performance scores based on the response to querying at least one task and a specified system performance model; and a setting routine, the setting routine setting at least one task to a resource utilization record associated with the global system performance score which optimizes system performance according to the specified system performance model.

21. A computer program product comprising:

a computer usable medium having computable readable code embodied therein including:

a routine to create a plurality of tasks capable of execution on a processor, each of the tasks having a priority;

a routine to create a task resource utilization vector for each of the plurality of tasks, the task resource utilization vector including at least one task utilization resource record specifying a resource quantity request for a system resource; and a routine to dynamically varying the resource quantity requests for each of the plurality of tasks based on the availability of the system resource and the priorities of at least two of the plurality of tasks.

22. The computer program product of claim 21 wherein at least one task resource utilization vector includes a plurality of task resource utilization records, and the routine to dynamically varying the resource quantity requests further comprises:

a run level assignment routine, the run level assignment routine assigning a run level to each task resource utilization record, each run level reflecting the associated task's ability to perform its work when allocated resources according to the associated task's resource utilization record;

an allocation routine, the allocation routine allocating the resource to each task based on each task's resource utilization records, run level, and priority, such that a first task having a priority greater than that of a second task will receive a first portion of the resource according to a preferred run level while a second portion of the resource is allocated to the second task;

a resource measurement routine measuring actual resource utilization of each task on a periodic basis; and an adjustment routine, the adjustment routine adjusting at least one of the plurality of tasks' resource utilization records such that the execution of the plurality of tasks is based on the efficient use of the resource.

23. The computer program product of claim 22 wherein the adjustment routine further comprises:

a resource consumption routine, the resource consumption routine computing the consumption of the resource for at least one task;

an update routine, the update routine updating at least one task utilization record to reflect consumption of the resource;

a query routine querying at least one task to determine if it can change its resource consumption;

a performance score routine, the performance score routine computing a plurality of global system performance scores based on the response to querying at least one task and a specified system performance model; and a setting routine, the setting routine setting at least one task to a resource utilization record associated with the global system performance score which optimizes system performance according to the specified system performance model.

* * * * *